(12) United States Patent
Shealy

(10) Patent No.: US 6,777,009 B1
(45) Date of Patent: Aug. 17, 2004

(54) COOKING APPLIANCE AND METHOD OF USE

(75) Inventor: Roger H. Shealy, Atlanta, GA (US)

(73) Assignee: CFA Properties, Inc., Wilmington, DE (US)

(*) Notice: Subject to any disclaimer, the term of this patent is extended or adjusted under 35 U.S.C. 154(b) by 0 days.

(21) Appl. No.: 09/408,068

(22) Filed: Sep. 29, 1999

(51) Int. Cl.[7] .............................................. A47J 37/12
(52) U.S. Cl. ........................ 426/231; 426/233; 426/438; 426/509; 426/523
(58) Field of Search .................... 99/329 R; 49/497; 426/233

(56) References Cited

U.S. PATENT DOCUMENTS

| | | | | | |
|---|---|---|---|---|---|
| 4,282,423 A | * | 8/1981 | Volz | ............................ | 219/490 |
| 4,437,159 A | * | 3/1984 | Waugh | ......................... | 364/400 |
| 4,601,004 A | * | 7/1986 | Holt et al. | ................... | 364/557 |
| 4,812,625 A | * | 3/1989 | Ceste, Sr. | .................... | 219/497 |
| 4,948,950 A | * | 8/1990 | Rae | ............................. | 219/497 |
| 5,038,676 A | * | 8/1991 | Davis et al. | .................. | 99/330 |
| 5,090,305 A | * | 2/1992 | Lehman | ........................ | 99/335 |
| 5,186,097 A | * | 2/1993 | Vaseloff et al. | ................ | 99/330 |
| 5,352,866 A | * | 10/1994 | Cartwright et al. | .......... | 219/497 |
| 5,398,597 A | * | 3/1995 | Jones et al. | .................... | 99/330 |
| 5,490,449 A | * | 2/1996 | Meister et al. | ................. | 99/330 |
| 5,847,365 A | * | 12/1998 | Harter et al. | ................ | 219/492 |
| 5,942,269 A | * | 8/1999 | Casey et al. | ................. | 426/233 |
| 6,018,150 A | * | 1/2000 | Maher, Jr. | .................... | 219/497 |

\* cited by examiner

*Primary Examiner*—Drew Becker
(74) *Attorney, Agent, or Firm*—Ryan A. Schneider, Esq.; Troutman Sanders LLP

(57) ABSTRACT

The present invention is directed to an improved cooking appliance, method of use and the product cooked in accordance with the invention. The invention includes a computerized controller for use with a cooking appliance, such as a deep-fat fryer. The invention employs a series of diagnostics in order to implement cooking compensations that insure consistent, well-cooked food in an industrial setting. The invention thus addresses various factors that can significantly affect the preparation of foods in a fryer, oven or the like. The invention accounts for variations in: cook time initiation; oil temperature stratification; batch size and unit size; cooking oil life; and cooking appliance performance.

18 Claims, 8 Drawing Sheets

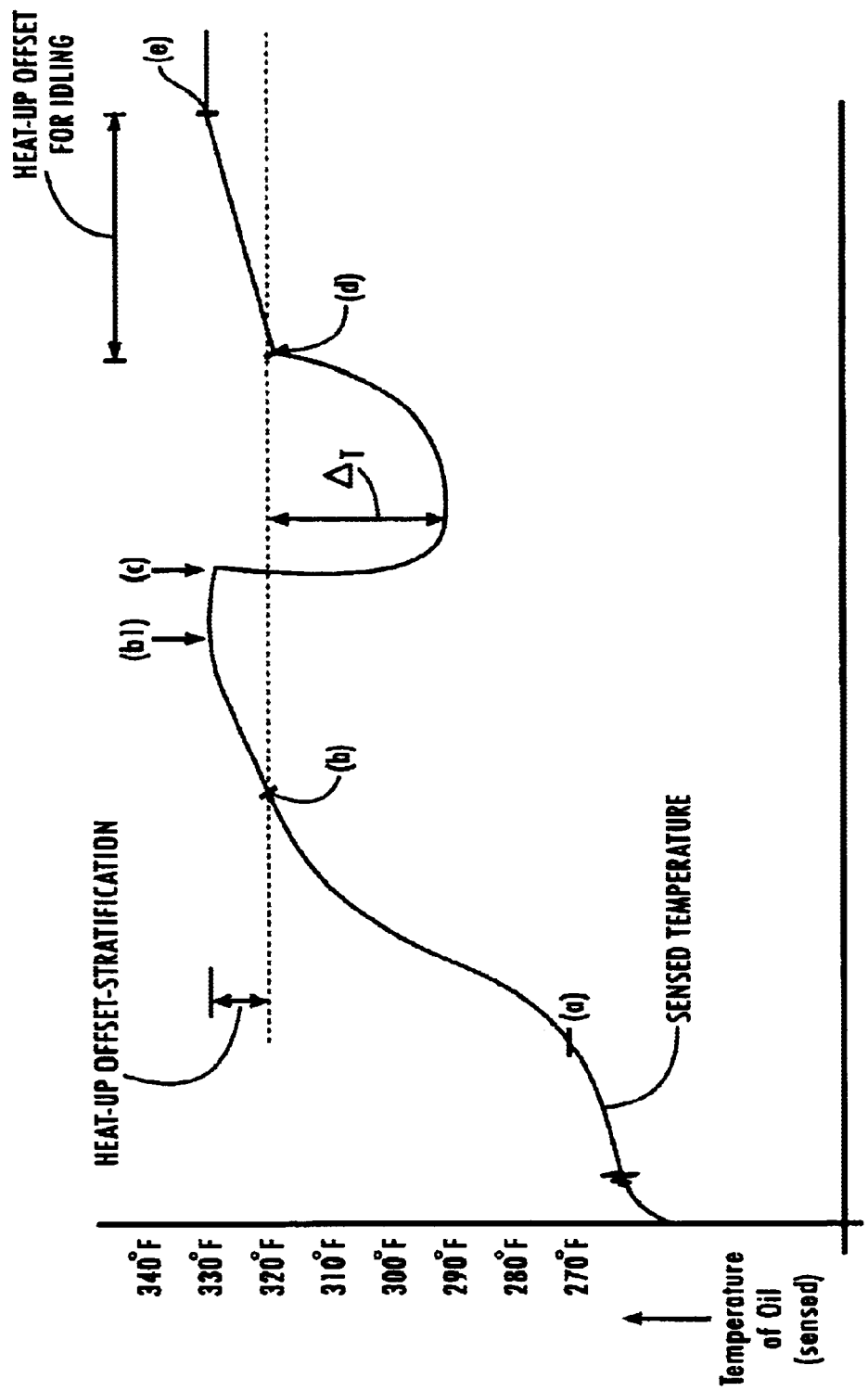
Fig. 4A (Single Cycle)

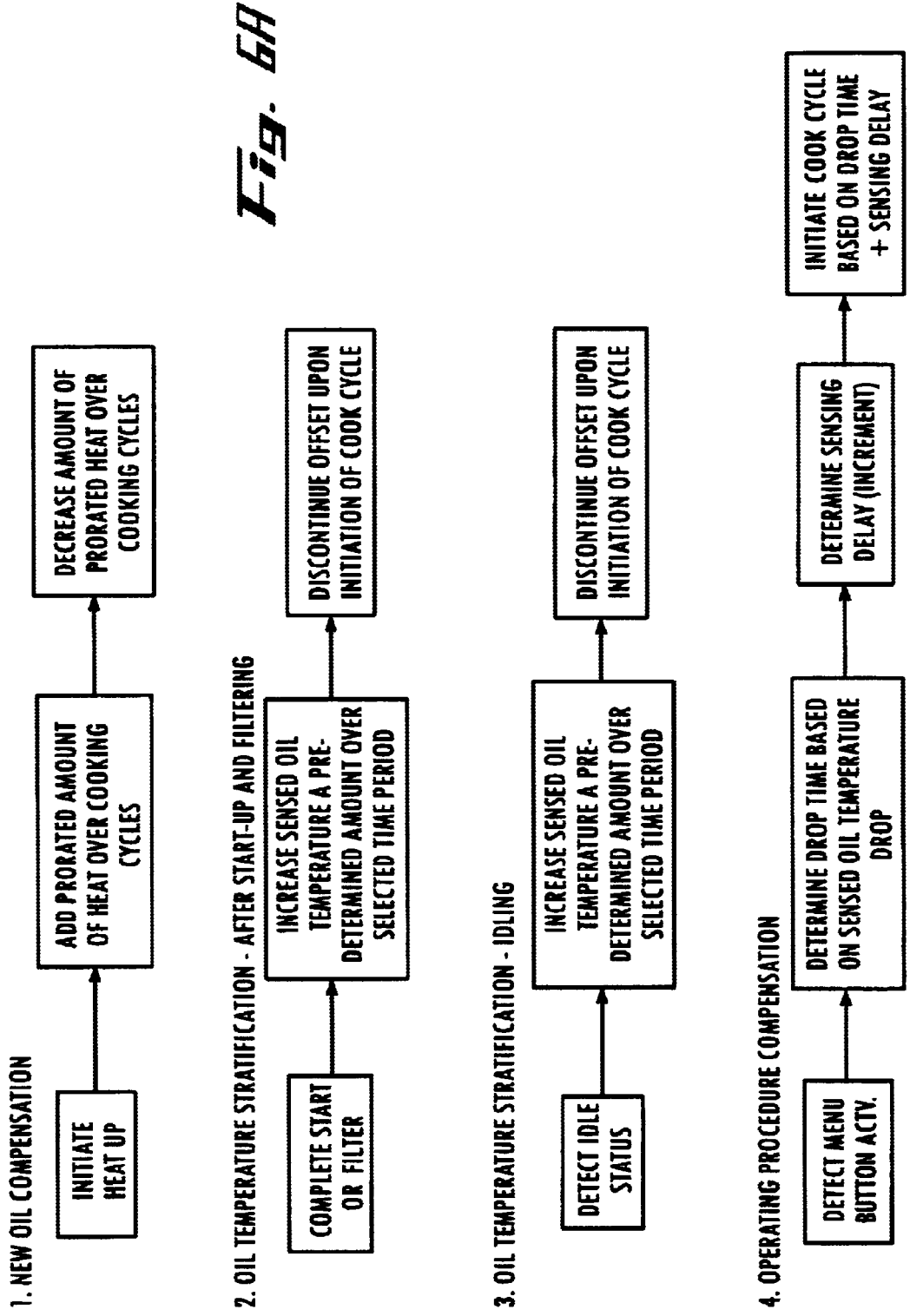

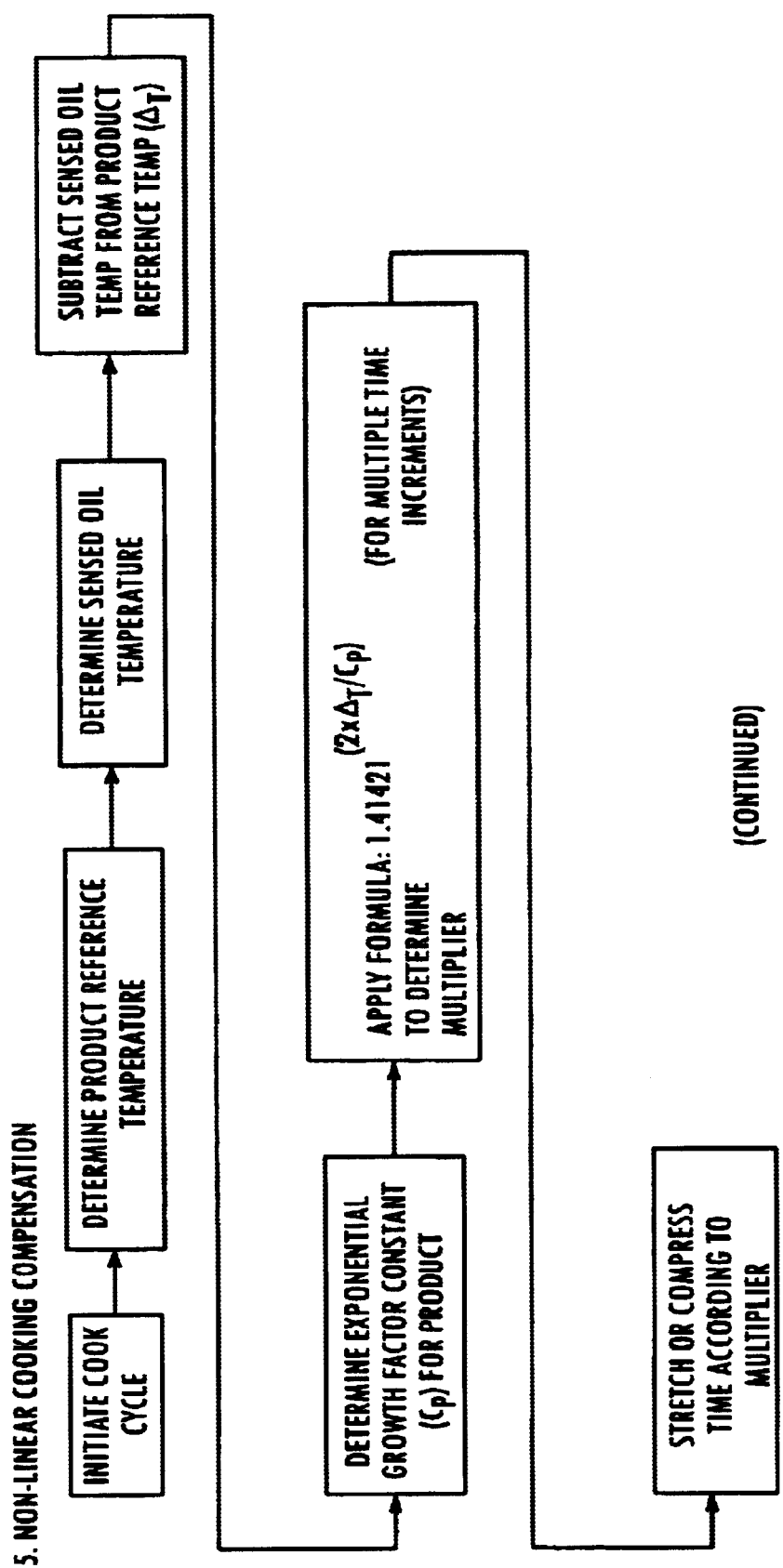

| | | Delta Temp | Derived Compensation Multiplier |
|---|---|---|---|
| | | -20 | 0.25 |
| | | -19 | 0.27 |
| | | -18 | 0.29 |
| | | -17 | 0.31 |
| | | -16 | 0.33 |
| | | -15 | 0.35 |
| | | -14 | 0.38 |
| | | -13 | 0.41 |
| | | -12 | 0.44 |
| | | -11 | 0.47 |
| | | -10 | 0.50 |
| | | -9 | 0.54 |
| | | -8 | 0.57 |
| | | -7 | 0.62 |
| | | -6 | 0.66 |
| | | -5 | 0.71 |
| | | -4 | 0.76 |
| Input Doubling Range | Fixed Multiplier | -3 | 0.81 |
| | | -2 | 0.87 |
| | | -1 | 0.93 |
| 10 | 1.41421 | 0 | 1.00 |
| | | 1 | 1.07 |
| | | 2 | 1.15 |
| | | 3 | 1.23 |
| | | 4 | 1.32 |
| | | 5 | 1.41 |
| | | 6 | 1.52 |
| | | 7 | 1.62 |
| | | 8 | 1.74 |
| | | 9 | 1.87 |
| | | 10 | 2.00 |
| | | 11 | 2.14 |
| | | 12 | 2.30 |
| | | 13 | 2.46 |
| | | 14 | 2.64 |
| | | 15 | 2.83 |
| | | 16 | 3.03 |
| | | 17 | 3.25 |
| | | 18 | 3.48 |
| | | 19 | 3.73 |
| | | 20 | 4.00 |
| | | 21 | 4.29 |
| | | 22 | 4.59 |
| | | 23 | 4.92 |

Fig. 7

COOKING APPLIANCE AND METHOD OF USE

TECHNICAL FIELD

The present invention relates generally to institutional cooking appliances and cooking food in such appliances. More particularly, the present invention relates to an improved cooking appliance utilizing a computerized controller and an improved method for cooking food utilizing said improved cooking appliance so as to obtain a consistent cooked food product.

BACKGROUND OF THE INVENTION

Restaurants strive to meet customer's needs and expectations at every opportunity. Such needs and expectations, however, are oftentimes inconsistent. For example, customers typically seek fast service, even to the extent of utilizing "drive-through" or "fast food" restaurants. In some restaurants, the customer may not need to leave his or her automobile to hurriedly place an order, to be served or to pay for the food. That same customer, however, will also want food that is fresh and well prepared. That same customer does not want an overcooked or overheated food item.

The restaurant also has certain needs and expectations. The restaurant will expect to prepare a significant volume of properly cooked food. The restaurant will typically purchase or lease specialized industrial appliances to prepare food on a large scale. That cost is significant. The restaurant will also seek to consistently serve quality, well-cooked food. Consistent food preparation is a constant challenge for the establishment and its employees. The restaurant further expects to be profitable. The restaurant will, therefore, seek to minimize both fixed and variable cost, including labor costs. One way of reducing labor costs is to require a single employee to perform multiple tasks. For example, the same employee that operates a cooking appliance may also be required to take a customer's order, package cooked (or other) food, deliver that food to the customer or process the financial transaction. As the food service employee is asked to provide such a wide range of tasks, it can be difficult to insure food quality through proper operation of the cooking appliances.

Restaurants often use industrial cooking appliances to prepare large quantities of food. One such industrial appliance is a deep fat fryer, including those manufactured by the Henny Penny Corporation of Eaton, Ohio. Prior art electric heating systems are known to provide a plurality of coils that surround the cooking well so that heat is transferred from the coils (sometimes referred to as the heating elements) to the oil in the cooking well. Prior art gas heating systems are known to provide tubes or pathways of heated air that surround the cooking well to impart heat to the oil.

Conventional use of such a fryer entails several steps. A predetermined amount of shortening is placed in the fryer's cooking well. In its unheated state, certain types of shortening consist of a solid with a paste-like consistency and appearance. The fryer's heating element is operated to melt the shortening to a liquid oil, and then to heat the oil to a desired cooking temperature. Other oils are conventionally provided in liquid form, even at ambient temperatures. The fryer is provided with an oil temperature sensor. Once the sensor indicates that a desired cooking temperature has been reached, a food product to be cooked is loaded into a carrier. The carrier is placed over and then mechanically "dropped" or eased into the hot cooking oil. Alternatively, the food product may be placed directly into the cooking well without use of a carrier or the like. As a result of this drop, it is known that the cooking oil will encounter "thermal shock," a lowering of the cooking oil temperature. It is known in the art to anticipate the drop and compensate for the anticipated drop by activating the heating system as soon as the cook cycle is initiated, regardless of whether the control system senses a drop in the oil temperature sufficient to cause the heating control to switch on. This practice is intended to remove the inherent delay the physical temperature sensing device requires to register the drop in oil temperature and to cause heating of the oil to begin.

It is further known in the art to provide the fryer a timer that should be activated consistently relative to the drop of uncooked food product into the cooking oil. The timer ideally operates to track the cook time and, once that time has expired, cooperates with an alarm to alert the operator of the conclusion of a cooking cycle.

The food product is typically cooked in the oil at a programmed or "set" temperature for a programmed or "set" period of time, regardless of batch size or the starting temperature of the food product or the starting temperature of the cooking oil. In many instances, these settings are fixed, making no compensation for temperature changes in the oil due to differing product temperatures or batch sizes. (Differing batch sizes may arise due to differing numbers of items being cooked or differently sized items, such as differently sized chicken breasts.) In more sophisticated appliances, often referred to in the art as "compensating controls," adjustments in cook time are made according to a linear scheme to compensate for oil temperature variations. Such schemes, in general, provide that if the sensed oil temperature drops "x" degrees, the cook time is augmented "y" percent; if the sensed oil temperature drops by "2x" degrees, the cook time is augmented "2y" percent; etc.

Another prior art appliance strategy is to manage the cooking oil temperature according to a predetermined temperature curve. The basic intent of this strategy is to expose the product being cooked to a similar environment for each cook cycle. An unfortunate by-product of this approach is that it tends to cook many batches slower than necessary because the predetermined temperature curve is typical based upon cooking a full or complete load. Accordingly, less than a full load is subjected to a lower cook cycle than is actually needed. The prior art has failed to recognize that the cook cycle and its associated attributes do not necessarily follow a linear model or scheme.

At the conclusion of that "set" time, an alarm sounds to alert the operator. The fryer is opened and the carrier is raised from the cooking well. The food product may be suspended over the cooking well for a brief period to allow hot oil to drain back into the cooking well. The cooked food product is then removed from the carrier and placed in a warming tray or the like for service to a customer.

Deep fat fryers are widely used to cook various food products, including but not limited to chicken, beef, fish, onions and potato products such as french fries and potato cakes. In each case, it is desirable to produce a consistently and properly cooked product. For example, undercooked chicken or meat may be contaminated by disease such as "*e coli*." At the same time, overcooked chicken or meat is undesirable to the customer.

The inventor has determined that variations in the cooked product may result from a variety of causes. These causes range from variations in the heating parameters, inherent limitations in prior art fryers, and variable operation of the fryer by an employee who has multiple tasks to perform. Such causes are discussed in greater detail hereinbelow. One limitation of prior art fryers is oil temperature stratification. The inventor has discovered that this condition results in different areas of the cooking well having oil heated to differing temperature. Oil temperature stratification occurs gradually over time due to idling or rapidly after an initial heat-up of the fryer. A simplified diagrammatic example of oil temperature stratification is shown in FIG. 1, which shows a cooking well with 3 levels of stratification. In this example, the temperature sensor is placed near the top of the cooking well. The desired cooking temperature is 325° F. and, as shown, the temperature sensor indicates that the cooking oil temperature is 325° F. However, due to oil temperature stratification, the oil temperature in the middle strata is only 300° F. (for example) and the temperature in the bottom strata is only 275° F. (for example). Thus, while the sensed temperature is 325° F., the average temperature in the cooking well is 300° F. and the temperature of the oil at the bottom of the well is significantly lower than the sensed temperature at the top of the well. Even if the oil in the cooking well was thoroughly stirred, the resultant temperature of the oil immediately after stirring would be approximately 300° F., not the desired cooking temperature of 325° F. It is to be understood that the foregoing is exemplary. The temperatures selected are for ease of description and demonstration. The problems associated with oil temperature stratification include inadvertently undercooking the food product and failing to account for a stirring of the oil, whether by manually stirring the oil or as a result of agitation due to cooking. Those of ordinary skill will appreciate that this temperature variation can be significant in terms of the cooked product. Photograph A shows chicken products cooked to varying internal temperatures, ranging from 285° F. to 345° F. in 15° F. intervals. As shown, the chicken cooked to 285° F. is significantly lighter than the chicken cooked to 315° F. Further, the chicken cooked to 345° F. is significantly darker than that cooked to 315° F.

Those of ordinary skill in the art will also recognize that another primary concern of fryer operation is to maintain a suitable cooking medium. The person of ordinary skill in the art is aware that the cooking process negatively affects the oil over time, and that cooking oil has a finite life. As an example, small pieces of food may be left in the oil. Also, the cooking oil will absorb oils and other materials from the food. It is, therefore, necessary to periodically filter the cooking oil in order to maintain a quality cooking medium.

It is known to provide a deep fat fryer with a filtering mechanism based upon the number of completed cook cycles. See, for example, U.S. Pat. No. 4,913,038, which generally addresses the need to filter the cooking oil. The '038 patent discloses a computerized control system for use with a deep fat fryer. The '038 patent recognizes the need to provide consistent cooked food quality through efficient and economical operation of the fryer. The '038 patent is directed to providing a selectable proportional control factor for controlling the heating element of the fryer. While such prior art methods and devices are extremely helpful in many respects, there is room for improvement. For example, many such prior art systems fail to recognize or compensate for the temperature stratification in the cooking oil due to the filtering process. The filtering process will also affect the temperature of the cooking oil, due to its removal from the heat source and aeration during the filtering and pumping operation. The cooking oil temperature will typically lower the average temperature of oil in the cooking well because the filtering operation mixes-up the oil.

A variety of other causes may produce an undesirable result. For example, once the restaurant has closed for the evening, it is typical to significantly reduce the temperature of the oil in the fryer, or even to turn the fryer off completely. This operation conserves energy and saves on related costs. Of course, this also requires that the fryer be restarted or at least that the shortening be reheated the next day before food products can be cooked in the fryer for sale that day. It is known in the art that the first run of cooked product, after a start-up, is typically of a different, usually of lower quality, as compared to later runs as the shortening reaches an efficient and proper operating temperature and condition. Of course, it is also possible that the first run of the day may often produce products that are of a different quality than later cooked product. The challenge to cook consistently remains. A related concern is that an operator may add new oil (at ambient temperature) to a fryer as necessary which also lowers the temperature of heated oil.

There are yet other factors that may cause differences in the final cooked product. For example, conventional deep fat fryers are constructed to cook a certain amount of product. The traditional amount is often referred to as a "load". However, while it may be desirable to cook a full load at lunch or dinner times, there are certainly other times when it may be desirable to cook only a partial load. Under such conditions, the standard cook settings of a conventional deep fat fryer may not be appropriate, thus making it necessary for an operator to monitor the partial load and adjust the fryer conditions as necessary.

Yet other factors may affect the final outcome of cooking a full or partial load of product in a deep fat fryer. For example, the heating element may not be providing a consistent heat source. This problem may be reflected in several ways. The input voltage may be below normal, or one of the heating elements may not be functioning properly or perhaps a heating coiled has failed entirely. Heating coils are recognized to have certain life-span and as the coil life approaches failure, it is possible that the coil is not performing adequately. Yet other factors include the size of the load or "batch" being cooked. Poorly cooked product may result from too small of a load, too large of a load or from the temperature of the product immediately prior to being cooked. For example, if the operator inadvertently places frozen un-cooked product into the fryer, but the fryer has been set to cook a thawed "load," the product may not be fully cooked.

Yet another concern discovered by the applicant is that the oil temperature within the cook well is not consistent. Instead, the oil temperature in prior art fryers often tends to stratify, such that the greatest or highest oil temperature is food at the top of the well and the lowest temperature is found at the bottom of the well. As a result, the food product being cooked at the top of the well is being cooked in a hotter oil than that food product at the bottom of the cook well. Thus, even within a single batch, the same product may be cooked with different results due to oil temperature stratification. Such stratification is inherent to the equipment and has gone unaddressed in the prior art.

Yet other cooking concerns include improper filtering of the oil during the many cooking cycles performed during a day and operator error such as improper loading of the chicken (too slow) or improper operation of the fryer (premature starting of the timer, etc.). Yet another concern is the need to recognize and compensate for failures in the fryer's heating system. A heating coil failure or a "brown out" may alter the temperature stratification typically found in the cooking well. A portion of the cooking oil may be unduly cool for cooking. Alternatively, the operator may notice that the chicken is not cooking completely and attempt to compensate by adjusting the temperature control upward or by extending the cooking time interval. Such operation is not only inefficient, it may also negatively affect the cooked product. Thus there is a need in the art for an improved control system for deep fat fryers that recognizes undue variances in the cooked product and the cooking process that may result from differing batch or piece size, fryer performance and product temperature.

The foregoing problems include, but do not fully recognize, the difficulties experienced by an operator or food establishment employee when using the industrial cooking appliance. Every restaurant, whether classified as a "fast food," diner or formal establishment, experiences times that are very busy and times that are slower. Every restaurant seeks to maximize profit, often by asking an employee to perform multiple tasks or "to cover" for an absent employee. This difficult position may result in depriving the employee of sufficient time to perform properly the cooking operation. For example, the employee may be so hurried that he or she may not activate the fryer's timer at the correct time. Such problems may be a result of high demand. For example, a food service person who has many customers impatiently waiting may ask or require that oversized loads or inappropriately frozen food be processed in the fryer or oven. If such an occurrence is frequent, management would need to be aware of such information so as to determine whether to purchase another fryer (or oven) or hire additional people or otherwise manage the business demand.

Several factors can, therefore, significantly affect the preparation of foods in a fryer. These factors include: (1) variations in the cook time (such as a variance in the start time of the timer due to operator distraction); (2) oil temperature stratification resulting from filtering cooking oil in the cook well; (3) oil stratification resulting from idling of the fryer during non-cooking periods; (4) variations in the uncooked product including product initial temperatures, batch size and unit size; (5) variation due to the condition or life of the cooking oil; and (6) variations in fryer performance.

SUMMARY OF THE INVENTION

The present invention addresses these problems of prior art fryers and method of use by providing an improved cooking appliance and method of cooking food products therein. More specifically, the present invention provides a computerized controller that recognizes the problems associated with prior art fryers and provides means for correcting such problems so as to consistently obtain the desired cooked food product.

Generally described, an apparatus according to the present invention includes a computerized controller and a cooking appliance, the appliance including a cooking well for operative retention of a cooking material, a heating element for heating the cooking material and a temperature sensor, and means for adjusting the cook time and temperature in response to certain sensed or programmed data so as to produce a consistent, well-cooked product. A method of cooking in accordance with the present invention includes cooking a food product in accordance with one or more diagnostics or cooking compensations that yield a consistent, well-cooked product. Yet further, the present invention includes a food item cooked in accordance with the invented method as, for example, by a cooking appliance made in accordance with the present invention.

Thus, a preferred embodiment of the present invention collects and maintains four (4) types of information: (1) cook data, which includes information relating to the immediately preceding cooking cycle; (2) day data, which includes information relating to the current day; (3) oil data, which includes information relating to the current oil batch; and (4) previous oil data, which includes information relating to the previous oil batch. The invention includes use of a computer. Programming logic discerns the beginning of a new day and when the oil has been changed. The present invention contemplates that such information may be discerned without need or use of a clock device. Programming logic may also be used to determine when information is converted or transferred, such as from "cook data" to "day data."

The present invention employs a set of diagnostics to effect certain working compensations in order to produce a consistently cooked, high quality product. A first diagnostic is to determine if heating rates are acceptable during a start-up period and after a filtering operation. To effect this diagnostic, an appropriate time value or range is determined empirically to represent acceptable heating between two temperatures, such as 270° F. and 310° F., and programmed into the computer. The actual time for the improved cooking appliance to progress from a first temperature to a second temperature, and/or the maximum rate of temperature rise between these two points, is monitored and captured. The captured actual time is then compared to the programmed value to determine if heating time is within the acceptable value or range. If heating is slow, an alarm may be actuated. The slow heat occurrence is added to the "cook data."

A second diagnostic is to determine if the power supply voltage is sufficient during fryer operation. The actual power supply voltage is monitored and averaged over a moving or sliding averaged time period (i.e., 10 seconds). If the actual power voltage calculated average drops below a predetermined acceptable value that is programmed into the computer, an alarm is activated. This occurrence is added to and stored in the "day data."

A third diagnostic is to determine if an actual cook cycle time is within acceptable limits. To conduct this diagnostic, each menu item is empirically given a range of acceptable cook times. The actual time required to complete a cook cycle for a given menu item is compared to a predetermined "slow cook time" programmed into the computer. If the actual time exceeds the slow cook time, an alarm may be activated. The slow cook time occurrence is added to the cook data.

A fourth diagnostic is to determine if an actual cook cycle time exceeded a maximum limit for cooking acceptable product. To conduct this diagnostic, each menu item is empirically assigned a programmable discord product value." The actual cook time is compared to the appropriate discard product value. If the actual cook time exceeds the discard product value, an alarm may be activated. A display is preferably provided informing the operator to discard the product. This discard product occurrence is added to the cook data.

A fifth diagnostic is to determine if the oil in the cooking well has been stirred. To conduct this diagnostic, a programmable oil temperature value is determined. If a negative oil temperature gradient is sensed and that gradient exceeds the programmed value, and a menu or operation button is not depressed (as for example, to initiate a cook cycle), the invention infers or thus "detects" that an oil stir has occurred.

Utilizing one or more of such diagnostics, the preferred embodiment of the present invention is able to effect a variety of cooking compensations. A first cooking compensation is for "new oil" To compensate for the effect of replacing unsuitable or "old oil" in the cooking well, sensed oil temperature is adjusted by an amount prorated over a select number of cooking cycles. The prorated adjustment is added to a reference temperature to determine an appropriate cooking time expansion or contraction period for use in the cook time compensation described hereinbelow. This 'new oil" compensation may have multiple levels. For example, the compensation may include an oil temperature gradient from 10° F. to 3° F. over 30 cook cycles; a decreasing oil temperature gradient from 3° F. to 2° F. over the next 70 cook cycles; and a decreasing oil temperature gradient from 2° F. to 0° F. over the next 900 cook cycles.

A second compensation is for the effects of oil temperature stratification after filtering the oil or after start-up. This compensation specifies that the sensed oil temperature be increased a predetermined appropriate amount over and above the desired cooking temperature. This compensation further provides that this offset is discontinued with the start of a cook cycle or the detection of a stir.

A third compensation is for the effects of oil temperature stratification due to oil idling. To effect this compensation, a prorated increase in temperature is made to the desired cooking temperature over a predetermined time period. This prorated increase is eliminated (reset to "0° F.") when a stir is detected or upon the start of a cook cycle.

A fourth compensation is for a variation in operating procedure. This compensation bases the start of a cook cycle on a sensed oil temperature drop. Thus, rather than utilizing prior art methods relying on an operator's initiation of the cook cycle by pressing a button or the like, this compensation relies on a change in the temperature of the oil within a predetermined time range enveloping the cook cycle activation (i.e., pressing the "start" button).

A fifth compensation is used to compress or augment the time variable during a cook cycle to counteract sensed temperature differences as opposed to a temperature reference point. This compensation utilizes a unit of time and, for each unit compares the sensed actual oil temperature with a reference temperature. Based on that comparison, the preferred embodiment utilizes a non-linear compensation algorithm to calculate a compensation value by a defined or programmable exponential equation. According to this value, the invention contemplates that the cook time element will be augmented or compressed accordingly.

Thus, it is an object of the present invention to provide an improved cooking appliance and method for use thereof.

It is a further object of the present invention to provide an improved cooking appliance and method for use that employs a set of diagnostics to effect working compensations in the cooking operation so as to obtain a consistent and well-prepared food product.

It is a further object of the present invention to provide an improved cooking appliance and method of use that addresses several factors that can significantly affect the consistency of a fried or cooked food product, including variances due to operator error or distraction.

It is a further object of the present invention to provide an improved cooking appliance and method of use that addresses variances in cooked foods due to limitations in prior art appliances such as cooking oil stratification.

It is a further object of the present invention to provide an improved cooking appliance and method of use that addresses variances in cooked foods due to variable factors such as batch size, fryer performance, product temperature and oil life.

It is a further object of the present invention to provide an improved cooking appliance and method of use that addresses variances in cooked product due to condition of the cooking oil.

It is a further object of the present invention to provide an improved cooking appliance and method of use that addresses maintenance of the appliance, including the difficulty of recognizing and trouble-shooting fryer performance and operation.

It is a further object of the present invention to provide an improved cooking appliance and method of use that compensates for the effects of new oil placed in a cooking appliance.

It is a further object of the present invention to provide an improved cooking appliance and method of use that compensates for the effects of oil temperature stratification.

It is a further object of the present invention to provide an improved cooking appliance and method of use that compensates for variations in or procedures employed to operate the appliance.

It is a still further object of the present invention to provide an improved cooking appliance and method of use that adopts and utilizes a non-linear, exponential compensation algorithm that augments or compresses cook time as necessary or appropriate.

It is a still further object of the present invention to provide an improved cooking appliance and method of use that adopts and utilizes a non-linear, exponential compensation algorithm that is timeable to the particular food item being cooked.

It is a still further object of the present invention to provide an improved cooking appliance and method of use that may be retrofit to existing prior art appliances.

It is a still further object of the present invention to provide a cooked food product that has been cooked in accordance with a method of the present invention.

It is a still further object of the present invention to provide an improved cooking appliance and method of use that utilizes diagnostic information to enhance performance of both the appliance and the operator through implementation of working compensations to produce a consistent, higher-quality cooked food product.

These and other objects, features and advantages of the present invention will become apparent from a reading of the following detailed description of the preferred embodiments in conjunction with the drawings.

BRIEF DESCRIPTION OF THE DRAWINGS

FIG. 3 is a detailed view of a control console for use with a cooking appliance constructed in accordance with the present invention.

FIG. 4A is a diagram indicating various states or stages of a preferred method of the present invention.

FIGS. 6A and 6B are block flow diagrams depicting the operation of the compensation of the present invention.

FIG. 7. Is a chart showing one embodiment of the derived compensation multiplier of the present invention.

DETAILED DESCRIPTION OF THE PREFERRED EMBODIMENT

Figure 1:
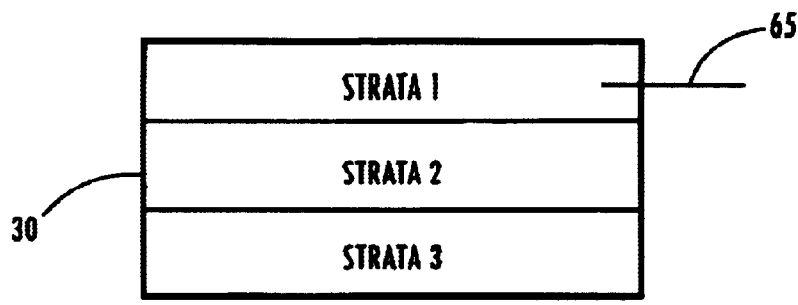
FIG. 1 is a diagrammatic view of a fryer cooking well demonstrating oil stratification.
Figure 2:
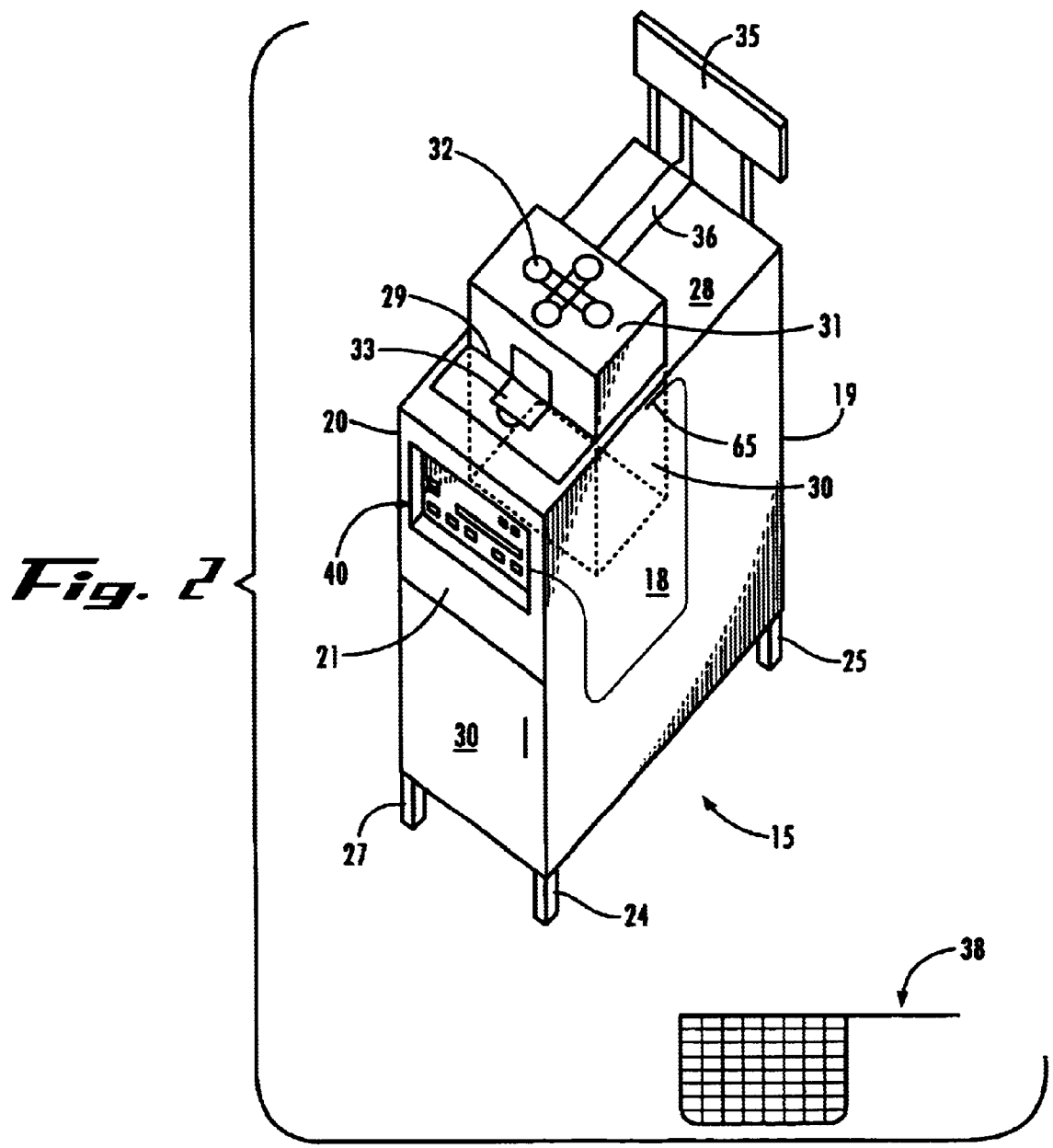
FIG. 2 is a perspective view of a cooking appliance constructed in accordance with the present invention.
Figure 1:
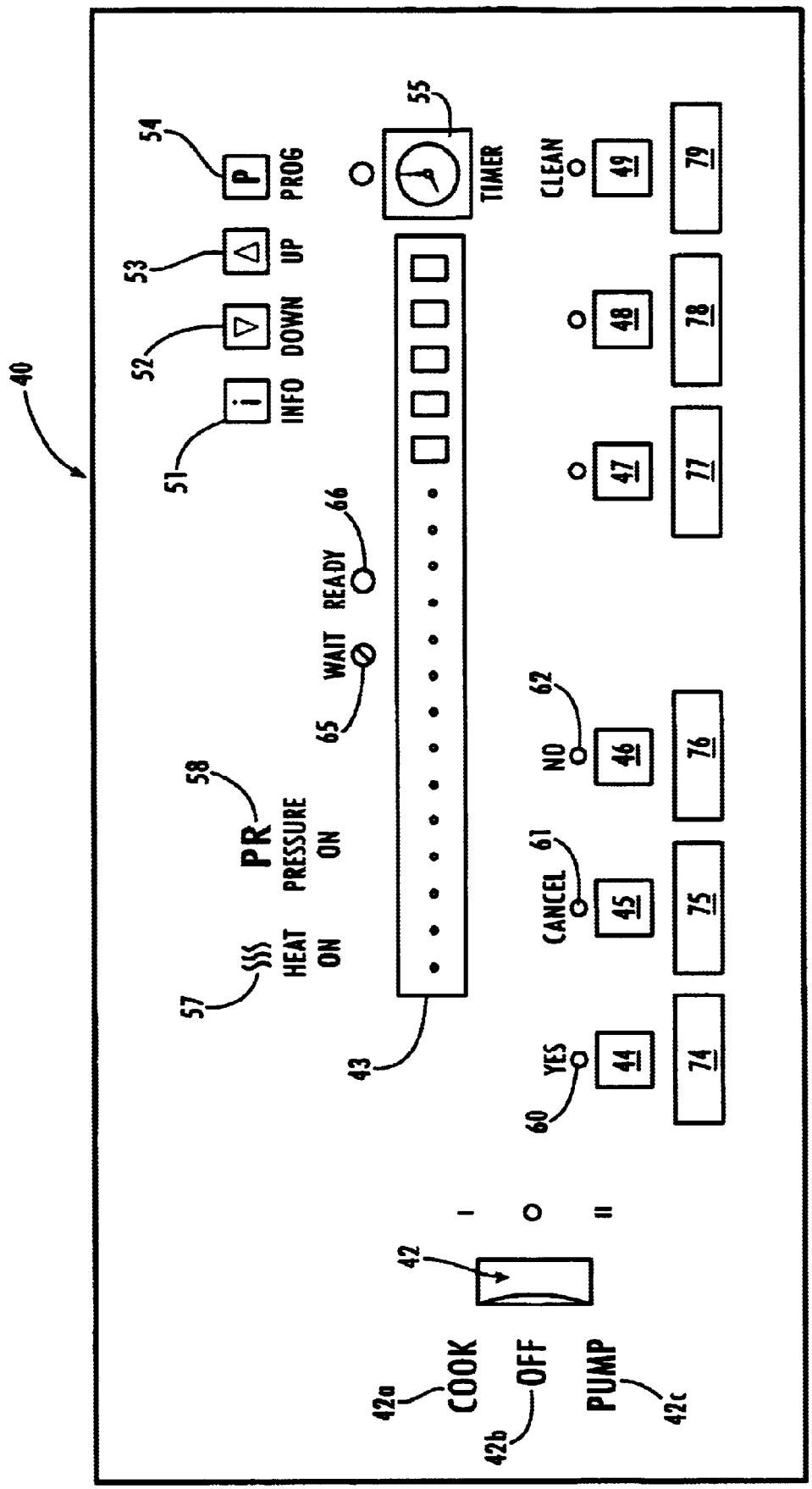

Referring now in more detail to the drawings, in which like numerals indicate like parts throughout the several views, FIG. 1 is a diagrammatic view of a prior art cooking well demonstrating the oil temperature stratification problem associated with such fryers. FIG. 2 discloses one type of deep fat fryer 15 for use with and practice of the present invention. The fryer 15 is provided with four side walls 18, 19, 20 and 21. These walls may be made of any suitable material, including stainless steel. The sidewalls 18–21 are secured one to another in a conventional manner and are supported by four legs 24, 25, 26 and 27. The front wall 18 includes a hinged door 30 for access to the internal working components (such as the heating assembly) of the fryer 15. The front wall 18 further includes a computer control panel, shown generally at 40 in FIG. 2 and in greater detail in FIG. 3. The operation of the control panel 40 is provided in detail hereinbelow.

The fryer 15 has a top surface 28 which defines an opening 29 to a cooking well 30. As shown in FIG. 1, the opening 29 is secured by a lid 31. The lid 31 may be made of any suitable material, including aluminum. The lid 31 is fitted with a rotary closure device 32 that insures an airtight fit about the top surface 28 of the fryer 15. The lid 31 is hinged so it can be readily opened by use of a front handle latch mechanism 33. The front handle latch mechanism 33 is known in the art and permits an operator to raise the lid 31 to gain access to the cook well 30. The lid 31 is in communication with a baffle 35 by means of piping 36. Those of ordinary skill in the art will appreciate that the baffle acts as a vent during a cook cycle or interval to facilitate proper operation of the fryer. Such construction is known in the art.

Further, the fryer 15 is capable of operative receipt of a wire carrier or basket 38. The basket or carrier 38 may be made of any suitable material, including steel and aluminum. The carrier 38 is configured to receive and carry the food item to be fried. For example, the carrier 38 may be configured to receive, carry and support chicken while it is fried in the cooking well 30. The basket or carrier 38 may be provided with a handle (not shown) to permit handling even when very hot. Thus, the handle is used to remove the carrier 38 from the cook well 30 after frying.

Referring to FIGS. 2 and 3, a controller 40 in accordance with the present invention is provided. The controller 40 is exemplary. Other configurations may certainly be provided within the spirit and letter of the invention. Those of ordinary skill in the art will appreciate that controller 40 define a front panel (also 40) and may have various configurations, yet be made in accordance with and practice the invention. Referring in detail to FIG. 3, the control panel 40 includes a power "on" button 42 which is defined by the designation "COOK," as indicated by arrow 42a. A second designation "off" is provided at 42b. A third designation, "PUMP," is shown at 42c. The preferred control panel includes a primary LED display or read-out 43 in the approximate center thereof. The control panel 40 further includes six operation buttons 44, 45, 46, 47, 48 and 49. The preferred control panel 40 also includes four function buttons 51, 52, 53 and 54. The buttons 51–54 are used to effect programming of the computer as described hereinbelow. Button 51 accesses data stored in one of four categories: cook data, day data, oil data and previous oil data. Cook data is information pertaining to the immediately preceding cook cycle. Day data is information pertaining to the current day. Oil data is information pertaining to the current batch of oil. Previous oil data is information pertaining to the previous batch of oil. These statistical categories and information collection and display devices are discussed in greater detail below. Button 52 directs a displayed integer or item in display 43 to be lowered. Button 53 directs an integer or item in display 43 to be raised. The operation and function of these buttons 51–54 is described in greater detail hereinbelow.

The control panel 40 also includes a timer button 55 and various indicators, including a "heat on" indicator 57 and a "pressure on" indicator 58. The control panel 40 also includes three indicator lights and associated designations 60, 61 and 62, respectively as follows: (1) "yes" (60), immediately above button 44; (2) "cancel" (61), immediately above button 45 and "no" (62) immediately above button 46. The control panel also includes two directional indicators, namely a "Wait" indicator 65 and a "Ready" indicator 66.

The preferred control panel further includes product designation areas 74, 75, 76, 77, 78 and 79. These areas 74–49 are available to visually identify the product to be cooked in the fryer 15. For example, product designation area 74 may read "Filet," product designation area 75 may read "Nugget," etc. The use of these designation areas 74–79 and their respective operative buttons 44–49 is described in greater detail below.

It is to be understood that the control panel 40 further provides a central processing unit (CPU) having a comparator (not shown), a memory device, either random access or read only, and means for displaying the processed information in the LED display 42. Those of ordinary skill in the art will appreciate that such devices are well known in the art and readily available. The control panel 40 also provides an alarm that may be sounded upon certain events. In addition, should any alarm sound, it is preferred that the LED display 42 flashes an appropriate message visually to reinforce the sounded alarm.

The fryer 15 is also provided with a temperature probe, represented by the reference number 65. The temperature probe 65 conventionally measures the temperature of the cooking oil at or near the top of the cooking well 30. The information gathered by the temperature probe 65 is provided to the computer/CPU for use in the comparator function in the usual manner as explained below.

One uses an improved cooking appliance in accordance with the present invention as follows. The fryer 15 is typically turned off at night by manipulation of the power button 42 to the "off" (42b) position. Accordingly, the fryer 15 must be turned on by manipulation of the power button 42 to the "cook" (42a) position. This operation powers the heating element (not shown), whether gas or electric, and begins the process of heating the cooking oil in the cook well 30 to a desired sensed cooking temperature. For purposes of this detailed description, it is presumed that the food product to be cooked is a load of chicken parts and that the desired sensed cook temperature is 320° F. Those of ordinary skill in the art will appreciate, however, that any variety of food products may be cooked at various oil temperatures within the spirit and scope of the present invention.

Once the fryer 15 has been turned on, the present invention preferably stores various information, including data pertaining to the immediately preceding cook cycle (Cook Data), data pertaining to the now previous days' cook cycles (Day Data), data pertaining to the current batch of oil (Oil Data), and data pertaining to the previous batch of oil (Previous Oil data). The oil temperature will have decreased significantly overnight to a temperature approaching ambient. The invention includes assigning a temperature setting that specifies the upper limit of the power-up oil temperature that triggers a "new day." For example, a preferred "new day" temperature is 125° F. Each time the fryer 15 powers tip with an oil temperature less than or equal to this value, the computer recognizes it to be a "new day." As a result, the contents of the Day Data record are transferred to the Oil Data record, and the Day Data record is emptied so as to begin collecting and storing data for the present day.

As the oil temperature increases during the power-up phase, the computer conducts a timed heat-up. More particularly, the computer automatically tracks the time it takes the oil temperature to heat from a first heat-up temperature setting to a second heat-up temperature setting as well as tracking the maximum rate of temperature rise experienced over small time increments. A preferred time increment is five (5) seconds. For example, a preferred first heat-up temperature setting for the instant example is 270° F., and a preferred second heat-up temperature setting for the instant example 316° F. The computer will track the time it takes to heat the oil temperature from 270° to 310° F. When the second heat-up temperature is reached, the computer will stop tracking the time and record the heat-up period in a "Heat-Ups Log" maintained in the Day Data record. In order to insure consistency in the recorded timed heat-up data, the computer will only perform the heat-up timing operation if the sensed oil temperature falls below a predetermined value. A preferred predetermined value for this example and embodiment is 270° F. A preferred predetermined value is 10° F. Thus, as explained in greater detail below, heat-ups arising from an idle mode will not be timed. In this example, a heat-up timing operation will be conducted only if the sensed oil temperature has fallen to at least 260° F. In this manner, the preferred embodiment seeks to conduct a heat-up timing operation only after power-up.

The present invention further includes comparing the computer tracked heat-up time period (in this example, between 270° F. and 310° F.) to an empirically derived "set" rate of rise and time period. The rate of rise is preferably expressed in degrees rise per minute, although the actual sampled interval may be much smaller. A preferred sampling interval includes 1 to 5 seconds. This set time period is preferably a range defined in seconds. The upper value of the range defines the maximum acceptable time for heating the oil from the first heat-up temperature to the second heat-up temperature. This maximum acceptable time, in turn defines a slow heat-up set point. In the event the comparison determines that the heat-up time has exceeded the slow heat-up set point, an alarm is sounded and these statistics are stored into memory.

Thus, it will be understood by those of ordinary skill that the computer will time the first heat-up after each power-up, provided that the oil temperature is low enough to permit it. If the actual time expired during heat-up from a programmable first heat-up temperature to a programmable second heat-up temperature exceeds a predetermined, empirically desired time, a slow heat-up alarm is sounded. In this manner a check is conducted of the heat-up ramp rate. The alarm alerts the operator to the possibility of a heating malfunction, such as a faulty coil, poor or failed connections, etc. A preferred slow heat-up time is between 60 and 110 seconds. In the event such an occurrence, the data is recorded in the "slow heat-up" log and stored in the Day Data record.

Figure 5:
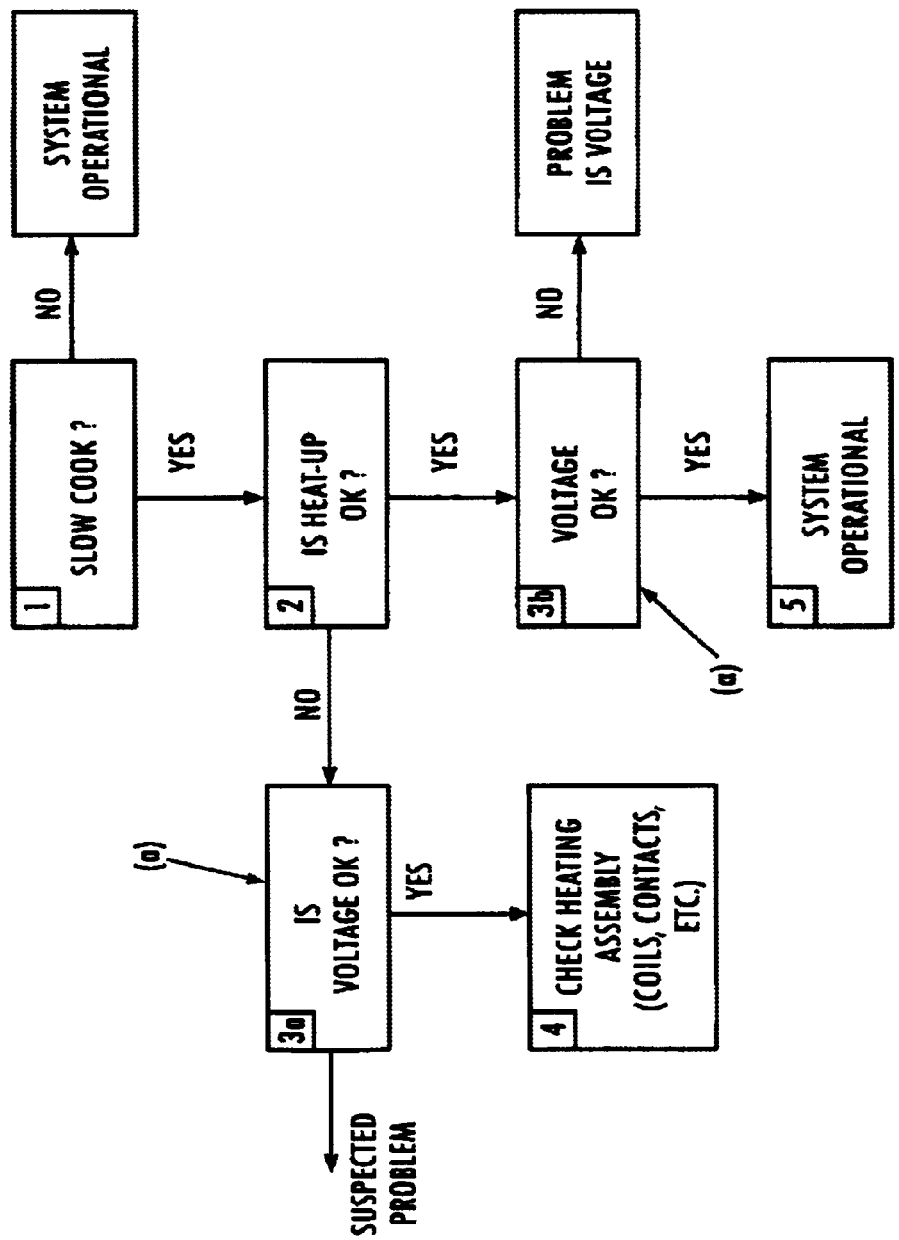
FIG. 5 is a block flow diagram depicting the operation of the low voltage trigger and logic decisions to be made therefrom.

The preferred embodiment of the present invention further includes a line volt low trigger setting which establishes the point at which a low voltage warning is to be issued. This setting, which is programmable into the controller 40 (computer), is specified as a percentage of the nominal fryer voltage. For example, a preferred trigger is 90%. Thus, according to the example, if the fryer operates on a nominal voltage of 208 VAC, the morning alarm is activated at approximately 187 VAC. The preferred embodiment further contemplates that the line voltage reading is preferably taken as a ten (10) second sliding average calculated as the average of ten (10) reading taken one (1) second apart. As a result, the value will not respond to short-duration deviations in line voltage. For example, a 20% voltage drop that lasted for only 1 second would cause the average value to fall only 2%. Thus, the alarm could not sound. This information comprises yet another diagnostic, which is represented diagrammatically in FIG. 5. This feature (the means of checking voltage are known in the art) allows the operator to determine whether the voltage is appropriate. (See decisions labeled "(a)" in FIG. 5.)

As the fryer 15 idles, the oil temperature will stratify. As shown in Figure. FIG. 1 shows oil temperature in strata, with the hottest temperature in the uppermost strata. (It is to be recalled that FIG. 1 is exemplary and for illustration purposes.) Laboratory testing has shown that unless the cooking oil is thoroughly stirred after heat-up, the oil in the lower part of the cook well is generally cooler than the oil in the upper part of the cook well. The present invention contemplates that the operator may address this stratification by heating beyond the desired cook temperature to counteract the oil temperature stratification. More particularly, the computer may be programmed to identify a heat-up adjustment temperature. If the fryer 15 powers up with a sensed temperature that is less than the heat-up adjustment threshold, then the computer will heat the cooking oil to a programmable target temperature that exceeds the desired cooking temperature. Once this target temperature has been reached, the computer will regulate the oil temperature to maintain the oil temperature at this target temperature until a cook cycle is started or a stir is detected. In this first manner, the present invention addresses the oil stratification condition.

The preferred embodiment of the present invention provides another method to address oil temperature stratification as a result of idling. Even well mixed oil gradually stratifies if the cooking well is not stirred or otherwise agitated. This method constitutes the best mode known to the inventor of accomplishing this concept of the invention. This compensation method for oil temperature stratification comprises adding a prorated quantity of heat (or, stated otherwise, temperature) to raise the sensed oil temperature over the desired cook temperature over a specified number of minutes. The prorated offset or idle temperature ramp is preferably programmable and adjustable. A preferred ramp has been empirically determined to be raising the oil temperature 10° F. per 30 minutes. Thus, in 30 minutes the oil temperature would have been raised to a maximum heat-up adjustment temperature of 10° F. In this example, if no other offsets were in action and the normal set temperature was 320° F., the sensed oil temperature would be 330° F. Once the adjustment temperature has been reached, the computer regulates the oil temperature to maintain this offset from the desired cooking temperature. Those of ordinary skill in the art will appreciate that the ramp rate may vary and the adjustment temperature may also vary depending on the particular circumstances. It is to be further understood that this prorated offset is reset to 0 (and started again) when either a stir of the oil is detected (as explained) or by the initiation of a cook cycle (also explained below).

As the compensation for idling is accomplished, the fryer 15 is ready for use and the oil temperature stratification condition is being addressed. When deemed necessary by the operator, a load of chicken parts is placed into the carrier and loaded into the cook well 30. Conventionally, the lid 32 is closed and the pressure increased. The person of ordinary skill in the art will appreciate that several things occur upon dropping a load. First, as a result thereof, the temperature of the oil is lowered. Second, as the chicken begins to cook, the oil is agitated. Third, in prior art fryers, the operator will initiate (or intend to initiate) a timer. However, as explained hereinabove, the operator may be so busy with other tasks that the timer may not be initiated consistently relative to the product being loaded into the heated oil.

The present invention compensates for such variations in cooking procedure by basing the cook cycle start on the sensing of a programmable oil temperature drop rate. This operation is started when an operation of menu button 44–49 is pressed to identify the product that has been loaded. The computer looks backward in time relative to a menu button 44–49 being pressed for a predetermined amount of time to determine if a product has been dropped by checking for a sufficient temperature drop rate. If no drop is detected, the controller 40 (computer) monitors the sensed temperature for a predetermined time after depression of button 44–49 for a product drop. If no drop is detected before or after button 44–49 is pressed, the controller 40 (computer) assigns a predetermined start time relative to the actual time button 44–49 was pressed. A preferred assigned start time may be determined empirically but is to be selected so as to insure that the food is cooked thoroughly. This method is used instead of merely initiating the cook cycle upon an operator's pressing of a timer button because this prior art method has been found to be highly variable in field observations. Thus, the present invention includes a drop trigger setting that specifies the temperature rate of rise value that is recognized as the drop point. A negative value indicates a drop in temperature.

Described by way of the instant example of the invention, the operator may load chicken fillets into the carrier 38. Once that load has been dropped into the cooking oil and the fryer lid closed and secured, the operator depresses function button 44, which activates the fillet cooking program. The computer will then look forward and backward of that activation time. A preferred time period is to look forward and backward for a period of time, up to 60 seconds each, for example. Thus, within a drop window of 120 seconds, for example, the computer looks to see if the sensed oil temperature in the cooking well has dropped a predetermined value in a predetermined period of time. For example, a preferred predetermined temperature drop rate is 0.2° F. per second. A preferred time window in which said temperature drop is to occur is 45 seconds. If the computer identifies a sufficient temperature drop during the defined drop window, the computer of the controller 40 will initiate the cook cycle as of that drop detect point rather than on the time when the operator depressed the timer button. If a sufficient drop is not detected, the computer of the controller 40 employs an empirically derived default time that is stored as a variable in memory.

The foregoing drop detection method is thus initiated when the operator presses a start or timer button. This methodology does not start the cook cycle merely upon pressing a function or menu button 44–49 or upon pressing a timer. Further, when the drop detect function is initiated, the computer will review data maintained in the Cook Data record to see if a drop in oil temperature has just recently occurred. If so, and if the temperature drop meets the drop trigger criteria set forth hereinabove, the drop detection function analyzes the time difference between the drop detect point and the time the start button was actually pressed. The calculated time difference is then used to adjust and anchor the cook cycle to the time the food was actually loaded rather than the timer button was depressed.

Yet further, there is an inherent physical time delay between when the food product is dropped into the cooking oil and when the temperature sensing function is triggered. This delay may be described as the delay between when an event occurs and the point of which the temperature probe senses the oil temperature drop. This inherent drop latency is compensated for by adding a set time period, such as eight (8) seconds, to the cook cycle period. To measure the appropriate latency, the following steps may be taken:

1. select a trigger value;
2. set the drop latency to "0";
3. cook several loads, preferably the most common batch size, being careful to drop the food and depress the start button at the same time;
4. during each cook cycle, utilize the computer to detect the time lag between the drop point and the time at which the temperature probe senses the oil temperature decrease (drop detect) due to introduction of uncooked product into the oil;
5. after conducting sufficient cook cycles to develop an acceptable consistency of results, calculate the average inherent delay time; and
6. program the cook cycle to add the average inherent delay time to the total cook cycle time.

Further to use of the present invention, the product to be cooked is dropped and the cook cycle is initiated upon operation of the drop detect and drop latency features described hereinabove. It is to be understood that the temperature probe 65 continued to sense the oil temperature at one position in the cook well 30 during the cook cycle. The preferred embodiment of the present invention includes application of a non-linear cooking compensation to counteract sensed temperature differences as opposed to a temperature reference. This non-linear, exponential cooking compensation breaks the cook cycle into multiple time increments and, for each such increment, compares the actual sensed temperature to the temperature reference variable for the specific product selected for cooking. The compensation then calculates a compensation value by means of a user-defined, programmable exponential equation, and augments or compresses the cook cycle time in accordance with that value. The equation is embodied in the following formula:

COOK CYCLE COMPENSATION TIME SET MULTIPLIER=
A raised to the power $((B \times \Delta_{TEMPERATURE})/C)$ where A=1.41421, for example where B=2, for example where C=exponential growth factor=50 for Waffle Potato Fries, for example $\Delta_{TEMPERATURE}$=Product Reference Temperature−Sensed Oil Temperature Thus, for an increment of time t, a given desired cooking or "set" temperature is established, such as 320° F. Due to idling temperature adjustment, however, the sensed temperature may be 325° F. The sensed cooking oil temperature is at the set temperature prior to the drop. Upon dropping the load, the sensed oil temperature will decrease over time. Thus, for example, during time increment $t_1$, the temperature may fall 13° F. over a ten second increment. The sensed temperature may now be less equal to or still greater than the product reference temperature. The product reference temperature is essentially the desired recipe cooking temperature. For $t_1$, the computer will compare the actual sensed temperature to the product reference temperature. The two values will be subtracted. In other words, to arrive at $\Delta T$, the actual sensed temperature will be subtracted from the product reference temperature or the "non-linear compensation temperature." If $\Delta T$ is less than 0, the oil temperature is cooler or lower than desired and the cook cycle time will be augmented in accordance with the compensation value. If $\Delta T$ is greater than 0, the oil temperature is hotter or higher than desired and the cook cycle time will be compressed in accordance with the compensation value. If $\Delta_T = 0$, the cook cycle will continue in real time with no augmentation or compression.

It is to be understood that the compensation value formula is applied for each time increment. The number of time increments is variable, so long as sufficient increments have been provided to permit meaningful adjustment of oil temperature. It is to be further understood that, for example, some prior art fryers would operate according to a linear methodology whereby if the oil temperature was 1% too cool, the cook time might be expanded by 2%, if the oil temperature was 2% too cool, the cook time might be expanded by 4%, etc. The present invention, however, employs a novel non-linear, exponential compensation. For example, application of the non-linear compensation method for a range of temperature differentials (between the reference temperature and the actual temperatures is provided in the following chart:

| $D_T$ (seconds) | $C_p$ | Time Expansion |
|---|---|---|
| 0 | 30 | $1.41421^{(0/30+2)} = 1$ |
| 15 | 30 | $1.41421^{(15/30+2)} = 1.42421$ |
| 30 | 30 | $1.41421^{(30/30+2)} = 2.0$ |
| 45 | 30 | $1.41421^{(45/30+2)} = 2.83$ |
| 60 | 30 | $1.42421^{(60/30+2)} = 4.0$ |

It is to be understood that the time expansion calculation above sets forth an exponential curve. It is to be further understood that the exponential growth factor ($C_p$) is an empirically defined constant for each product to be cooked. To determine this constant, the following process may be employed:

(1) Determine the time and temperature settings required to cook the smallest batch size reasonably expected to be cooked (such as, for example, 4 fillets) and the largest batch size reasonably expected to b e cooked;

(2) Set the reference temperature to the average oil temperature after a statistically meaningful number of cook cycles have been conducted for that batch size; and (3) Determine the constant by manipulation of the constant from the smallest reasonably expected batch to the largest reasonably expected batch until the optimally cooked product is obtained for each batch.

FIG. 7 shows the results of such a manipulation for a various of differential temperatures. It is to be understood that such an operation is to be performed for each product and an optimal constant chosen for each product. The inventor has determined that an optimal constant for chicken fillets is 27–30. Thus, the example above utilizes a constant of 30. However, a different constant is to be empirically obtained for each food product to be cooked in the appliance. For example, the constant for potato waffle fries has been determined to be 50. It will be appreciated by those of ordinary skill in the art that the foregoing defines a non-linear compensation that compresses and/or stretches time during the cook cycle to counteract sensed temperature differences in comparison to a temperature reference. The compensation takes defined time interval and for each such interval, compares the set temperature with the reverence temperature (which is stored for each product), calculates a compensation value by this user-defined exponential equation, and stretches or compresses the cook time element accordingly.

Cooking oil has an acceptable life span. At the beginning of that life span, chicken cooked in "new oil" typically adopts a pale color. Thus, although such chicken may be fully cooked, it lacks the aesthetically pleasing "golden-brown" color. Alternatively, chicken cooked in oil that is nearing the end of its life span is often times too dark. Once again, while such chicken is fully cooked, it is not "golden-brown." In initiating the cook cycle, it is desirable to know if the cooking oil in the well 35 is new. To address these issues, the present invention contemplates a "new oil temperature adjustment" and "new oil temperature adjustment cycles." The new oil temperature adjustment provides how much the cooking oil temperature will be increased when new oil is installed into the cooking well 35. The method contemplates decreasing the new oil adjustment over a specified number of cook cycles. This compensation may include several defined temperature gradient offsets to match the cooking changes as the oil ages. Thus, for example, the best mode of accomplishing this function as presently known to the inventor, is to increase the cooking oil temperature by 15° F. for the first cycle or new oil and ramp the offset down to 4° F. by the $29^{th}$ cook cycle. A second stage then ramps the offset from 3° F. to 2° F. over cook cycles 30 to 99. A third stage then ramps the offset temperature from 2° F. to 0° F. over cook cycles 100–1000. Such an approach allows the possibility to limit the number of offset gradients to a lesser number for simplicity, if desired, by specifying the first gradient from some elevated temperature offset to a second offset of 0° if only one gradient were preferred. For the next 70 cook cycles (numbers 31 to 100), the temperature increase is decreased for 3° F. to 2° F. For the remainder of the cooking oil life span, no temperature increase is provided. Thus, the new oil temperature adjustment feature of the present invention provides for new oil to be heated significantly and then prorated over a determined number of cook cycles so as to provide a chicken product that is consistent with that cooked in older cooking oil. It is to be understood that this temperature adjustment is solely for the purpose of addressing new oil considerations and does not assist or affect other features of the invention such as the reference temperature when determining compression or decompression of the cooking time in accordance with the cooking compensation algorithm.

The inventor has discovered that within the fryer cooking well 30, the oil temperature varies significantly or "stratifies" from top to bottom of the well. Laboratory testing has shown that unless the cooking oil in the well 30 is thoroughly and repeatedly stirred after being heated, the cooking oil in the lower portion of the cook well is generally cooler than the cooking oil at the top of the cooking well. This phenomenon is particularly true immediately after start-up of the fryer 15 and after filtering the oil. The theory behind this feature is to increase the temperature at the top of the cooking well 30 to a higher than desired temperature to compensate for the cooler oil temperature at the bottom of the cooking well. To achieve this compensation for oil temperature stratification, the controller 40 provides the option of heating the cooking oil in the cooking well 30 beyond the predetermined cooking set point (e.g. 320° F.). Once the cooking process has began, this additional heat is no longer necessary and the oil temperature is returned to the cooking set point. This operation thus differs significantly from load anticipation, in that this new method compensates for oil temperature stratification to yield the approximate correct "average" oil temperature before the cook cycle begins as opposed to the current method of reacting to oil temperature drop once the cook cycle has been initiated. This new method results in the oil temperature falling much less below the desired "set" temperature value when product is introduced to the cooking well since the portion of the oil temperature drop due to stratification is essentially eliminated. Load anticipation is a reactive approach which requires the fryer to recover temperature during the cook cycle for both oil temperature stratification and temperature drop due to the loading of cold product mass.

It has further been recognized that a preferable way in which to address oil temperature stratification is by initiating a stir of the cooking oil. The present invention provides a stir detection and offset reset feature to accommodate for manual stirring. This feature may be employed for stirring during oil re-heating (described above) or during idling oil temperature stratification compensation (described above). In either case, if a sufficient oil temperature negative gradient is sensed, such as for example –0.10° F. per second, the computer recognizes this event as a stir and the stratification offset is reset to 0 before beginning the gradual increasing of temperature offsets again. This idling stratification function is also activated at he completion of a cook cycle. The maximum temperature offset and the time period desired to ramp from 0° F. offset to the maximum offset, are stored in memory.

The invention also includes a function to indicate when the useful life of the oil has been exhausted. It is know that different products effect the condition of the oil to different degrees. Fresh, heavily breaded products, for instance, may have a much greater impact on the frying oils life than a non-breaded product such as a potato fry. Other factors can also impact oil life , such as spice content, water content, cooking duration, the degree that a product and/or its coatings fall into the oil, and the amount of time oil is heated, even if not cooking. Each product program, initiated by buttons 44–49, has a oil degradation value assigned for each cook cycle. Freshly breaded chicken nuggets may carry a degradation value of 1.5 whereas a product such as chicken strips may carry a oil degradation value of 0.8. The controller maintains a running summation of all product cook cycles multiplied by their corresponding degradation values for a given batch of cooking oil. Furthermore, the amount of time that the oil is heated and not actively cooking, expressed in minutes, can be accumulated and multiplied by a stored degradation value, say 0.02 per minute. An "oil life" variable can be stored to indicate when the oil has reached its useful life. When the "oil life" variable value is exceeded, the controller activates an alarm and sends a message to output #43 to change the oil at the next filter cycle and every filter cycle thereafter until the oil is changed (indicated by use of the "clean" function used to control oil pot cleaning temperatures).

Thus, it is to be understood that the computer may be engaged through manipulation of the controller 40. The programming mode of the computer is preferably engaged by pressing the PROG button 54. Once in that mode, the operator may enter the desired programmable data such as the preferred new day temperature, the first heat-up temperature, the second heat-up temperature, the slow heat-up time, the heat-up adjustment temperature, the drop detection temperature, the drop trigger, the drop latency, the drop window, and the stir detect trigger. The computer is preferably programmed in a conventional manner to display prompts and information in the display area 43. The details of such programming are known in the art and beyond the scope of the present invention.

Figure 4B:
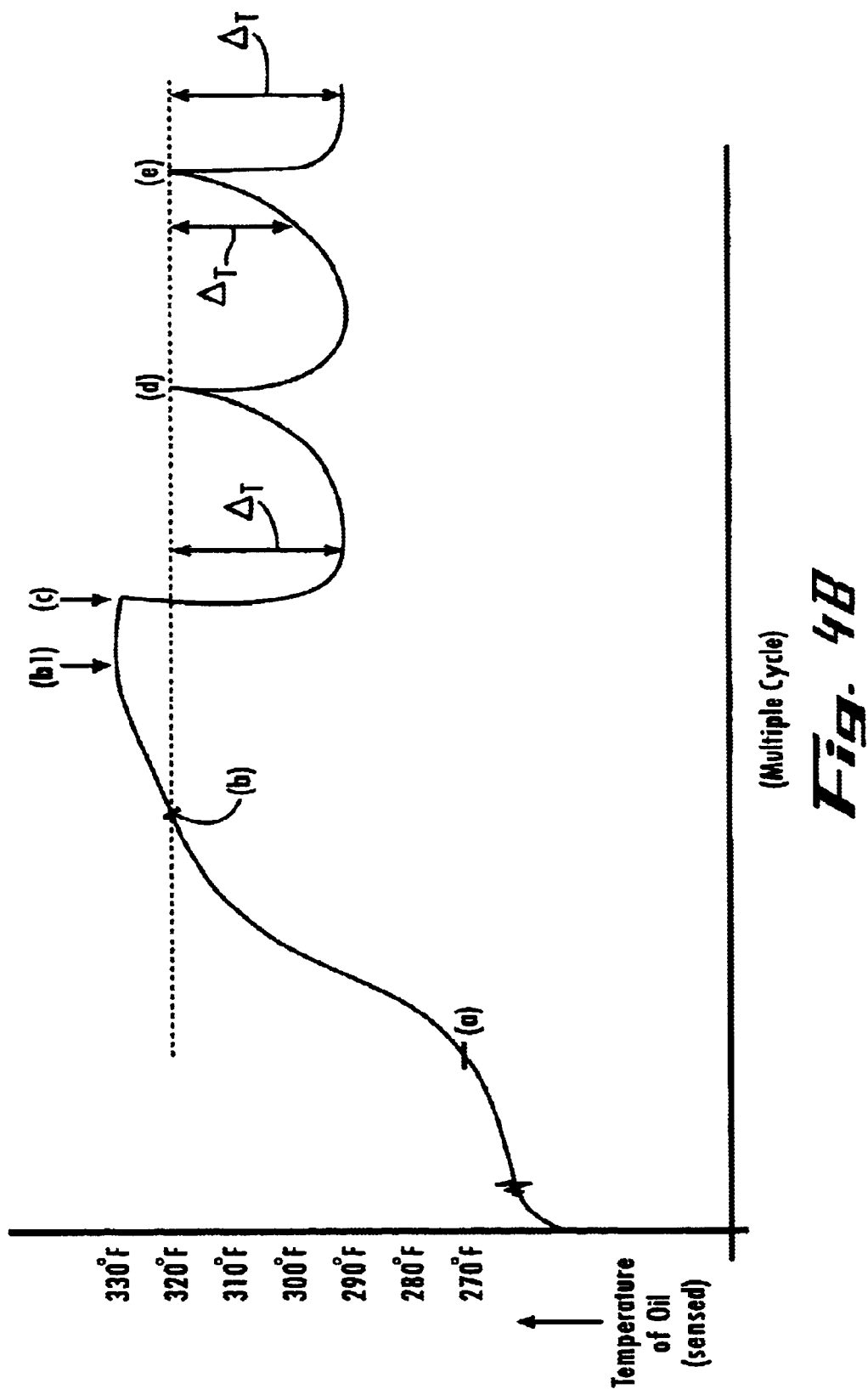
FIG. 4B is a diagram indicating various states or stages of a preferred method of the present invention.

FIG. 4, more particularly FIG. 4A and FIG. 4B, show various stages of the invention. Referring to FIG. 4A, the heat-up check is conducted from designation "(a)" to designation "(b)." Thus, point "(a)" is the threshold temperature (270° F.) and the heat-up is monitored until the temperature reaches the normal set point at "(b)." A ten degree (10° F.) heat-up offset is then performed and reached at point (b)(1). At point (c), a drop in temperature has been detected due to loading a product into the fryer. (The drop detection could also be sensed due to a stir.) A cook cycle is conducted between points (c) and (d) in accordance with the non-linear, exponential compensation described hereinabove. One iteration of this compensation is indicated by the line "$\Delta_T$." Of course, the compensation is performed many times over the cook cycle. At the conclusion of the cook cycle (d), the idling heat-up offset is conducted between points (d) and (e).

Referring to FIG. 4B, a multiple drop graph is shown. A new product load has been introduced to the cooking oil at points (c), (d) and (e). For each cycle, the non-linear cooking compensation has been performed, as indicated by the lines labeled $\Delta_T$. Since there is no idle time between point (c) and (e), no offset is employed as in FIG. 4A.

It is to be understood that the foregoing invention may be retrofit to any prior fryer by adaptation of a controller 40 constructed in. accordance with the present invention to the fryer so as to provide an improved cooking appliance. Further, it is to be understood that the foregoing description is not limited to pressure fryers. Many other cooking appliances may be constructed in accordance with the present invention, such as open fryers or ovens or otherwise.

The present invention further includes a cold start diagnostic that looks at the time the cook cycle was initiated to see if the sensed oil temperature was within an acceptable range (5° F., for example) of the desired set point plus any compensation temperature (explained below) which indicates a "cold cook start". Such cold cook starts are known to significantly increase the cook time of the product and reduce its quality of color and texture as well as increasing oil pick-up. If a cold cook start is sensed, an alarm is sounded, and an appropriate message is displayed on display #43. This allows operator to permit the fryer to reach operating temperature before loading product.

The fryer control computer memory is designed, to store important operational statistics into memory. These statistics are placed into 4 classifications, which are: cook data (statistics for the last cook cycle), day data (data for the current day of cooking), oil data (data for the current batch of oil), and previous oil data (data for the current batch of oil) are available to the operator by pressing buttons 51 and 54 to enter "information mode". Access for this data is useful for troubleshooting as well as for summarizing the performance of the fryer, utilities, and operational procedures.

Cook data contains information on the most recent cook cycle, namely what product was cooked, when the automatic drop detection detected the product drop relative to the button being pressed, the average sensed oil temperature, the maximum average voltage, and the minimum average voltage.

Day data contains information on fryer operation for the current day. Variables include the number of heat-ups, the number of slow cook cycles, the slowest oil heat time between two defined temperatures, the maximum average voltage, the minimum voltage, total cook cycles for all products, and the number of cook cycles for each individual product type, and the number of cold cook starts for each product type.

Oil data contains information on fryer operation for the current batch of frying oil (since the oil was last changed). Variables include the number of days on the oil, the number of heat-ups, the number of slow cook cycles, the slowest oil heat time between two defined temperatures, the maximum average voltage, the minimum voltage, total cook cycles for all products, and the number of cook cycles for each individual product type, and the number of cold cook starts for each product type.

Previous oil data contains information on fryer operation for the previous batch of oil. Variables include the number of days on the oil, the number of heat-ups, the number of slow cook cycles, the slowest oil heat time between two defined temperatures, the maximum average voltage, the minimum voltage, total cook cycles for all products, and the number of cook cycles for each individual product type, and the number of cold cook starts for each product type.

The present invention includes another diagnostic that utilizes many of the integer diagnostics and information stored in the day data, oil data, and previous oil data statistics to present important information to the Manager. It is known in the industry that the Managers of food establishments have many distractions that prevent them from dedicating large amounts of time to observe processes and equipment. It is also well know that improper functioning of equipment, utilities, and improper operational procedures can damage the quality of the food product served to the customer. Such problems can even endanger the customer's health by exposing him to inadequately cooked, potentially hazardous foods. The intent of this diagnostic (which is comprised of several performance checks) is to provide the Manager with a means of viewing top level summary on the performance of a fryer and the crew members operating the fryer. In this example, by pressing button 51 then button 47, the controller processes day data, oil data, and previous oil data information stored in the controllers memory that informs the Manager of key events and conditions that reflect the performance of the fryer, the performance of the utilities feeding the fryer, and the performance of the crew to follow procedures. The intent of this function is to give reliable information that can drive action to repair utilities, repair the fryer, and enforce operational procedural conformance.

The first "performance check" offers the ability to validate the performance of the power source to the fryer. This function looks at stored day data, oil data, and previous oil statistics for voltage alarms and tells the operator how many low voltage alarms have been experienced for the day, this batch of oil, and the previous batch of oil on display 43. If no voltage alarms have been experienced for the day, the operator is informed that voltage is normal on display 43. This information is important since sufficient power supply is fundamental to the proper operation of the fryer and the quality of the product it produces.

The second "performance check" offers the ability to diagnose the ability of the fryer to adequately introduce heat into the oil. For a judgment to be on the fryer, the power source must first be removed as a potential cause of malfunction. The controller first looks at stored day data statistics at voltage alarm statistics to see if voltage has been reliable. If voltage has been reliable (in this example no more than 1 voltage alarm for the day), the controller looks at stored statistics for slow heat-ups (time and/or rate of rise) and displays how many slow heats have been experienced for the day, this current batch of oil, and the previous batch of oil. If a more than an acceptable defined number of slow heats is experienced during the day (say 2 or more, for example) and the last heat-up event did not cause a slow heat alarm, then the coils or burners are considered good and the operator is warned on display 43 to check contactors/gas regulator, connections, and wiring/piping. If, however, the last heat up caused a slow heat alarm, then the operator is informed to check the coils or burners as well as the contactors/gas regulator, connections, and wiring/piping on display 43. If no heat-up alarms are experienced, the user is informed that heating capacity appears normal on display 43.

The third "performance check" is designed to tell the operator which products have been cooking slowly during the day that aren't attributable to voltage or heating capacity issues. The function looks at stored day statistics to verify that supply voltage has been reliable and heating capacity has been acceptable (sum of low voltage alarms+Slow heat alarms equals 3 or less incidents for the day, for example). Given that heating capacity and voltage are acceptable, if more than a defined % of cook cycles for any product resulted in slow cook start alarms (say 5%, for example), the total amount of slow cook starts for that product is displayed on display 43. This performance check is useful to the operator as an indication that the crew is not allowing the fryer to reheat sufficiently after heat-ups or between cook cycles.

The fourth "performance check" function is designed capture the loading of oversized batches of product or the loading of product that is inappropriately frozen. This function must first remove voltage and insufficient heating capacity as a cause of long cook cycles. This function builds on results from the third "performance check" defined above to validate supply power and heating capacity. If a particular product has experienced slow cooks above a define threshold for the day (say 1, for example), the control subtracts the number of cold cook starts from the number of slow cooks for that specific item and displays this result along with a message that workers are likely loading oversized or frozen product into the fryer (if frozen inappropriate).

The fifth "performance check" is designed to indicate if the operators of the fryer are not allowing the fryer to reach an acceptable operating temperature before loading product. This function also builds on the result of the third performance check. If more than a defined amount of cold cook starts is experienced in the day (say 0, for example), this performance check warns on display 43 that the crew is not letting the fryer get to operating temperature before loading specific products, and how many times a particular product's cook cycle has been started when below acceptable start temperature.

While this invention has been described in detail with particular reference to the preferred embodiments thereof and the best mode of practicing same, it will be understood that variations and modifications can be effected within the spirit and scope of the invention as described hereinabove and as set forth in the appended claims.

What is claimed is:

1. A method of cooking using a cooking medium that is used over a number cooking cycles, wherein the cooking medium is newest at cooking cycle 1, and is older at cooking cycle n, the method of cooking comprising the following steps:

loading a food item into the cooking medium;

heating the cooking medium to a temperature $T_c$ that is dependent on the number of cooking cycles of the cooking medium, the subscript $c$ in $T_c$ being the number of cooking cycles the cooking medium has been through from the first to the nth, $T_1$ being the temperature of the cooking medium at cooking cycle 1, and $T_n$ being the temperature of the cooking medium at cooking cycle n;

controlling with a controller the heating of the cooking medium through cooking cycles, wherein $T_c$ is greater than $T_{c+1}$ wherein $T_n$ is the reference temperature of the cooking medium, the controller compensating for the introduction of a new cooking medium by adjusting the cooking cycle temperature $T_c$ for each cooking cycle to be greater than or equal to the reference temperature $T_n$, wherein the cooking cycles c from 1 to 30, the difference between $T_1$ and $T_{30}$ is a temperature beginning at approximately 10° F. over $T_n$ and falling to approximately 3° F. over $T_n$.

2. The method according to claim 1, wherein $T_n$ is the reference temperature of the cooking medium, the controller compensating for the introduction of a new cooking medium by adjusting the cooking cycle temperature $T_c$ for each cooking cycle to be greater than or equal to the reference temperature $T_n$ to provide a uniformity of food item color over n cooking cycles using the same cooking medium.

3. The method according to claim 1, further comprising the step of programming the controller with a program to control the heating of the cooking medium through the cooking cycles.

4. The method according to claim 1, wherein for cooking cycles c from 31 to 100, the difference between $T_{31}$ and $T_{100}$ is a temperature beginning at approximately 3° F. over $T_n$ and falling to approximately 2° F. over $T_n$.

5. The method according to claim 4, wherein for cooking cycles c from 101 to 1000, the difference between $T_{101}$ and $T_{1000}$ is a temperature beginning at approximately 2° F. over $T_n$ and falling to approximately 0° F. over $T_n$.

6. A method of cooking using a cooking medium that is used over a number cooking cycles, wherein the cooking medium is newest at cooking cycle 1, and is oldest at cooking cycle n, the method of cooking comprising the following steps:

loading a food item into the cooking medium;

heating the cooking medium to a temperature $T_c$ that is dependent on the number of cooking cycles the cooking medium has been through, the subscript $c$ in $T_c$ being the number of cooking cycles the cooking medium has been through, $T_1$ being the temperature of the cooking medium at cooking cycle 1, and $T_n$ being the temperature of the cooking medium at cooking cycle n;

controlling with a controller the heating of the cooking medium through cooking cycles, wherein $T_c$ is greater than or equal to $T_{c+1}$, wherein $T_n$ is the reference temperature of the cooking medium, the controller compensating for the introduction of a new cooking medium by adjusting the cooking cycle temperature $T_c$ for each cooking cycle to be greater than or equal to the reference temperature $T_n$, wherein for cooking cycles c from 1 to 29, the difference between $T_1$ and $T_{29}$ is a temperature beginning at approximately 15° F. over $T_n$ and falling to approximately 4° F. over $T_n$;

wherein for cooking cycles c from 30 to 99, the difference between $T_{30}$ and $T_{99}$ is a temperature beginning at approximately 3° F. over $T_n$ and falling to approximately 2° F. over $T_n$; and wherein for cooking cycles c from 100 to 1000, the difference between $T_{100}$ and $T_{1000}$ is a temperature beginning at approximately 2° F. over $T_n$ and falling to approximately 0° F. over $T_n$.

7. A method of cooking using a cooking medium that has temperature stratification, wherein $T_{desired}$ is the desired cooking temperature of the cooking medium, the method of cooking comprising the following steps:

sensing the actual cooking medium temperature $T_{actual}$;

providing a controller that directs the heating of the cooking medium, the controller compensating for the cooking medium temperature stratification;

heating the cooking medium to a cooking temperature of $T_{desired}$ plus a stratification offset;

maintaining the temperature of the cooking medium once the actual cooking medium temperature $T_{actual}$ equals the desired cooking temperature $T_{desired}$ plus the stratification offset.

8. The method of cooking according to claim 7, further comprising the step of sensing agitation of the cooking medium, wherein upon sensing agitation of the cooking medium, the stratification offset is set to zero.

9. The method of cooking according to claim 7, further comprising the step of monitoring the temperature rate of change of the cooking medium, wherein upon reaching a pre-programmed temperature rate of change, the stratification offset is set to zero.

10. The method of cooking according to claim 8, further comprising the step of sensing the initiation of a cooking cycle, wherein upon sensing the initiation of a cooking cycle, the stratification offset is set to zero.

11. The method of cooking according to claim 8, wherein the stratification offset is a rate of temperature change.

12. The method of cooking according to claim 11, wherein the stratification offset is a rate of temperature change of 10° F. per thirty minutes.

13. A method of cooking using a cooking medium, the method compensating the start of a cook cycle on a cooking medium temperature drop rate, the method of cooking comprising the following steps:

(a) setting a predetermined cooking medium temperature drop rate;

(b) setting a predetermined cook cycle;

(c) sensing the cooking medium for temperature drop rates;

(d) sensing the activation of an operation trigger that identifies a food product has been loaded into the cooking medium, and noting the time of such activation;

(e) reviewing the sensed cooking medium drop rates of step (c) from a first predetermined amount of time prior to the time of the activation for the predetermined cooking medium temperature drop rate, and if the predetermined cooking medium temperature drop rate is found starting the cook cycle at the time of the predetermined cooking medium temperature drop rate;

(f) if the predetermined cooking medium temperature drop rate is not found during the period of time of step (e), then reviewing the sensed cooking medium drop rates for a second predetermined amount of time after the time of the activation for the predetermined cooking medium temperature drop rate, and, if the predetermined cooking medium temperature drop rate is found, starting the cook cycle at the time of the predetermined cooking medium temperature drop rate.

14. The method of cooking according to claim 13, wherein the first predetermined amount of time is approximately 60 seconds.

15. The method of cooking according to claim 13, wherein the predetermined cooking medium temperature drop rate is approximately 0.2° F. per second for a period of approximately 45 seconds.

16. A method of cooking using a cooking medium comprising the following steps:

providing an initial cook time for the length of time a food item cooks in the cooking medium;

providing a product reference temperature being the preferable cooking medium temperature for the food item;

sensing the cooking medium temperature; and determining an actual cook time for the food item by adjusting the initial cook time, the actual cook time being the initial cook time multiplied by a non-linear cooking compensation multiplier wherein the non-linear cooking compensation multiplier is the formula A raised to the power (($B \times \Delta_{TEMPERATURE}$)/C);

where A is approximately 1.41421;

where B is 2;

where C is an exponential growth factor constant related to the particular food item;

and where $\Delta_{TEMPERATURE}$ is the product reference temperature—the sensed cooking medium temperature.

17. The method of cooking according to claim 16, wherein C is between 27 and 30.

18. The method of cooking according to claim 16, wherein C is 50.

\* \* \* \* \*